United States Patent [19]

Raftopoulos et al.

[11] 4,195,929
[45] Apr. 1, 1980

[54] METHOD FOR DETERMINING PROPERTIES OF OPTICALLY ISOTROPIC AND ANISOTROPIC MATERIALS

[75] Inventors: Demetrios D. Raftopoulos; Stamatios V. Kartalopoulos, both of Toledo, Ohio

[73] Assignee: University of Toledo, Toledo, Ohio

[21] Appl. No.: 948,317

[22] Filed: Oct. 3, 1978

Related U.S. Application Data

[63] Continuation-in-part of Ser. No. 761,128, Jan. 21, 1977, Pat. No. 4,119,380.

[51] Int. Cl.$^2$ ............................................. G01B 11/16
[52] U.S. Cl. ......................................... 356/32; 73/800
[58] Field of Search ..................... 356/32, 33, 34, 35; 73/800

[56] References Cited
PUBLICATIONS

"Reflected Shadow method for the Study of Constrained Zones in Cracked Plates", Theocaris; Applied Optics, vol. 10, No. 10, Oct. 1971, pp. 2240-2247.

*Primary Examiner*—Vincent P. McGraw
*Attorney, Agent, or Firm*—Wilson, Fraser, Barker & Clemens

[57] ABSTRACT

A method for optically determining the ratio of Poisson's ratio to modulus of elasticity for optically isotropic and optically anisotropic transparent materials and then for determining the stress-optical constants for such materials. A collimated monochromatic light beam is directed at the tip of a crack in a loaded thin plate specimen of the material and the diameters of the resulting transmitted and reflected caustics are measured at points equidistant from the specimen. The light beam also is directed to an uncracked region in a loaded thin plate specimen of the material and the number of displaced fringe reflected on a screen are counted for a predetermined change in loading. The ratio of Poisson's ratio to modulus of elasticity and the stress-optical constants are determined from the thickness of the specimen, the displaced fringe count, the wavelength of the light beam and the ratio of the caustic diameters.

5 Claims, 6 Drawing Figures

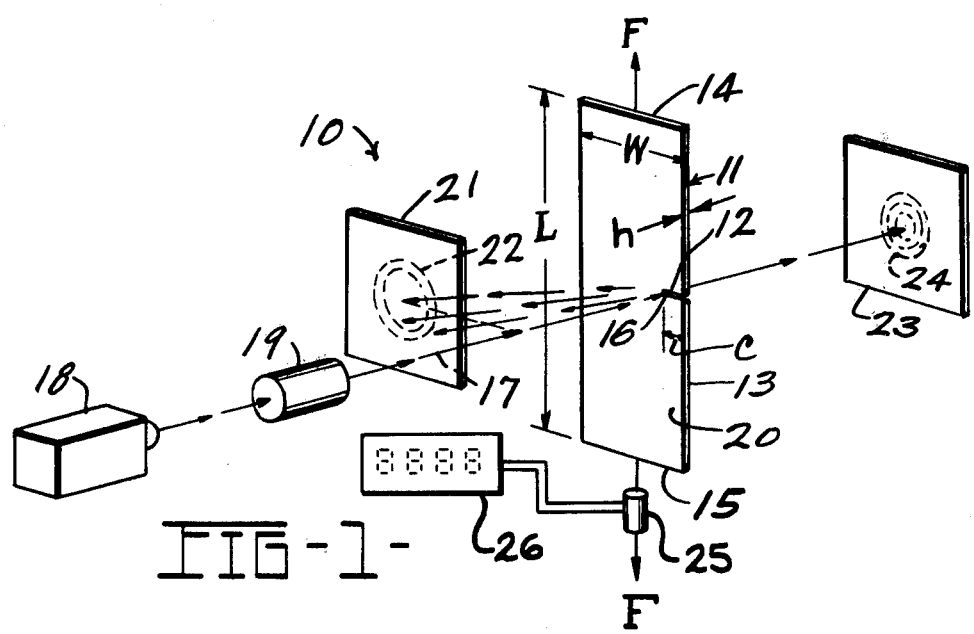
FIG-1-
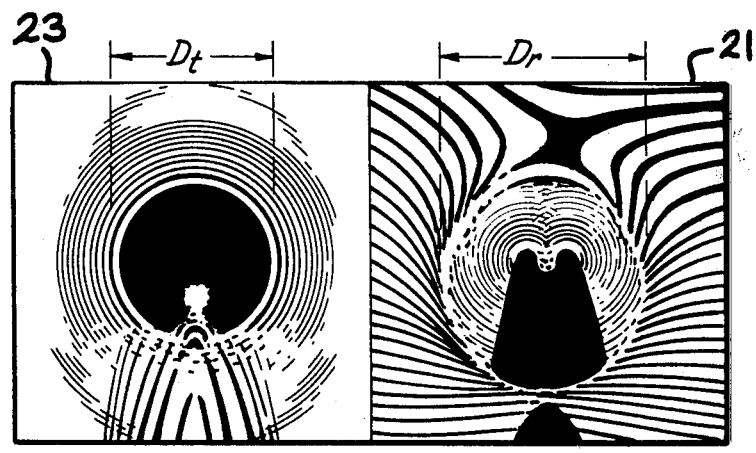
| TRANSMITTED CAUSTIC 24 | REFLECTED CAUSTIC 22 |
FIG-2-

METHOD FOR DETERMINING PROPERTIES OF OPTICALLY ISOTROPIC AND ANISOTROPIC MATERIALS

CROSS REFERENCE TO RELATED APPLICATIONS

This is a continuation-in-part of our copending application Ser. No. 761,128 filed Jan. 21, 1977 and entitled "Method For Determining Stress-Optical Constants Of Optically Isotropic And Anisotropic Materials", now U.S. Pat. No. 4,119,380.

BACKGROUND OF THE INVENTION

This invention relates to measuring and testing, and more particularly to an improved method for optically measuring the ratio of Poisson's ratio to modulus of elasticity and the stress-optical constants for optically isotropic and anisotropic materials.

Knowledge of the properties of a material can be extremely important when designing and manufacturing products from such material. For example, knowledge of the stress-optical constants or coefficients are useful when designing products manufactured from optically isotropic and anisotropic materials to prevent failures when the material in the product is stressed. For a cracked specimen, the stress distribution at the tip of the crack is responsible for the propagation of the crack under certain conditions, and ultimately may result in a fracture of the product.

Prior art methods for measuring stress-optical constants of optically isotropic and anisotropic materials involve the use of a type of interferometer for producing an interferogram in a stressed specimen. For accuracy, it is necessary for the interferometer and the load on the specimen to be accurately calibrated. This requires very delicate and very expensive instruments. The instruments must be operated by specialized scientific personnel, further increasing the cost of these measurements. As a consequence, stess-optical constants generally are not measured or provided to the designer by the manufacturer of the material among the other standard mechanical specifications for the material.

In obtaining the stress-optical constants and other properties for optically isotropic and anisotropic materials, it is necessary to know or to measure the ratio of Poisson's ratio (v) to the modulus of elasticity (E). Poisson's ratio is defined as the ratio of lateral deformation to longitudinal deformation for a loaded specimen. The modulus of elasticity or Young's modulus for a loaded specimen is defined as the ratio of stress to strain within the elastic range. Methods for evaluating the modulus of elasticity and Poisson's ratio through the use of strain gauges are well known. However, these methods are inaccurate when used on physically small and thin specimens. The adhesive used to bond the strain gauges to the specimen tends to reinforce the specimen and, as a consequence, cause inaccuracies in the evaluation. These inaccuracies in the indicated ratio of Poisson's ratio to modulus of elasticity in turn effect the accuracy of other properties of the specimens determined therefrom, such as the stress-optical constants.

SUMMARY OF THE INVENTION

According to the present invention, a method is provided for optically determining the ratio of Poisson's ratio to modulus of elasticity for optically isotropic and anisotropic materials and for determining the stress-optical constants for such materials. The method does not require attaching strain gauges to specimens of the material, as in prior art techniques. Nor does the method require highly skilled scientific personnel for evaluating the material specimens.

The ratio of Poisson's ratio modulus of elasticity and the stress-optical constants for an optically isotropic material or an optically anisotropic material are determined from optical properties of stressed specimens of the material in both cracked and uncracked regions. A collimated monochromatic light beam is directed substantially perpendicular to the tip of a crack in a flat plate specimen of the material loaded in a direction transverse to the directions of the crack and the light beam. This produces both transmitted and reflected caustics which are directed to screens placed equidistant on either side of the specimen. The diameters of the reflected and transmitted caustics are then compared to obtain a caustic ratio (q). The collimated monochromatic light beam is also directed to either an uncracked region of the loaded specimen or to an uncracked, loaded thin plate specimen of the same material to produce a reflected fringe pattern. The loading on this specimen is changed and the average number $(\overline{N})$ of fringes displaced past an arbitrary point in the reflected pattern is determined for a change in load (P). The ratio of Poisson's ratio (v) to modulus of elasticity (E) is then determined from the formula.

$$\frac{v}{E} = \frac{\lambda h}{2Q} \frac{\overline{N}}{P}$$

where $\lambda$ equals the wavelength of the light beam, h equals the width of the uncracked specimen and Q is defined as $$Q = \frac{(q^{5/2} - 1)}{(q^{5/2} - 2)}$$

After the ratio of Poisson's ratio to modulus of elasticity is determined, the stress-optical constants are determined. The reflected stress-optical constant $c_r$ is determined from the formula $$c_r = \frac{v}{E}(1/2 - Q)$$

and the transmitted stress-optical constant $c_t$ is determined from the formula $$c_t = \frac{2c_r}{q^{5/2}}$$

Accordingly, it is an object of the present invention to provide an improved method for easily determining the ratio of Poisson's ratio to modulus of elasticity for optically isotropic and optically anisotropic materials.

Another object of the invention is to provide a method for determining the ratio of Poisson's ratio to modulus of elasticity for optically and anisotropic materials which does not require the attachment of strain gauges to a specimen of the material.

Still another object of the invention is to provide an improved method for optically determining the ratio of Poisson's ratio to modulus of elasticity and the stress-optical constants for optically isotropic and anisotropic materials.

Other objects and advantages of the invention will become apparent from the following detailed description, with reference being made to the accompanying drawings.

BRIEF DESCRIPTION OF THE DRAWINGS

FIG. 1 is a pictorial drawing of apparatus for obtaining the relative diameters of reflected and transmitted caustics from a specimen and for applying the method of the present invention;

FIG. 2 is a sketch showing typical reflected and transmitted caustics obtained from the apparatus of FIG. 1;

DESCRIPTION OF THE PREFERRED EMBODIMENT

Figure 3:
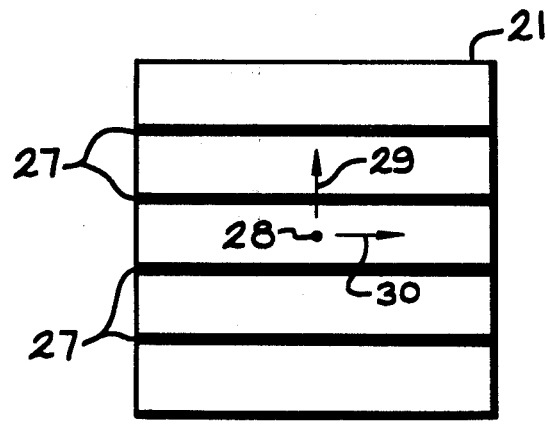
FIG. 3 is a sketch showing a typical reflected fringe pattern from a loaded specimen of an optically isotropic material.

According to the method of the present invention, the ratio of Poisson's ratio to modulus of elasticity and the reflected and transmitted stress-optical constants are readily determined for optically transparent materials and specifically for optically isotropic and anisotropic materials. The method generally consists of evaluating flat, thin plate rectangular specimens of the material both in an uncracked region and in a region of the tip of a crack or slit extending perpendicular from near the center of a long edge of a specimen and extending in a direction perpendicular to a loading force applied to the specimen. The specimen is impinged with a collimated monochromatic light beam in the region adjacent the tip of the crack to produce reflected and transmitted caustics and in an uncracked region to produce reflected fringes. The effective diameters of the reflected and transmitted caustics at points equidistant on either side of the specimen are measured to obtain a ratio of the reflected-to-transmitted caustic diameters. For the uncracked region of the specimen or of another specimen of the same material, the specimen thickness is measured and the average number of reflected fringes passing an arbitrary point on a screen are counted for a predetermined change in the loading force applied to the specimen. From this data, the ratio of Poisson's ratio of modulus of elasticity and the stress-optical constants are determined.

Turning to FIG. 1, a pictorial diagram is shown of apparatus 10 for obtaining a pattern of reflected fringes from an uncracked specimen and for obtaining reflected and transmitted caustics from a cracked specimen 11 of either an optically isotropic material or an optically anisotropic material. The specimen 11 is in the form of a flat rectangular plate or sheet having a length L, a width W and a thickness h. A narrow crack or slit 12 is formed in a region near the center of the one of the longer edges 13 of the specimen 11. The crack 12 extends substantially perpendicular from the edge 13 for a distance or length C. A load or force F is applied to opposite ends 14 and 15 of the specimen 11 to induce planar stresses in the specimen 11 in a direction substantially perpendicular to the crack 12. The critical area in the specimen 11 is in a tip region 16 of the crack 12, since the crack 12 will propigate from the tip 16 when the force F is increased sufficiently. Therefore, the caustics are produced from the region of the constrained zone in the vicinity of the crack tip 16. In preparing the specimen 11, steps should be taken to assure that the caustics are not adversely influenced by free surfaces of the specimen 11. Preferably, the specimen length L should be about 3 to 4 times the width W and the crack length C should be about 0.1 to 0.3 times the specimen width W. If the crack length C is less than this value, the caustic may be influenced by the edge 13 of the specimen 11. The crack 12 may have a greater length C than 0.3 times the width W of the specimen 11, however, the specimen 11 will be appreciably weakened and stresses in the region of the crack tip 16 will increase as the crack length C increases.

The caustics are produced by impinging a collimated monochromatic light beam 17 on the specimen 11 in a constrained region adjacent the crack tip 16. The light beam 17 may be produced by any suitable source, such as a laser 18 and a collimator 19. The beam 17 is directed to the specimen 11 from a direction substantially perpendicular to a flat surface 20 of the specimen 11. The beam 17 should be projected from within about 1° of a perpendicular to the specimen surface 20. However, the beam 17 should not extend exactly perpendicular to the surface 20 since it should not coincide with or interfere with the caustic reflected from the specimen surface 20.

Figure 6:
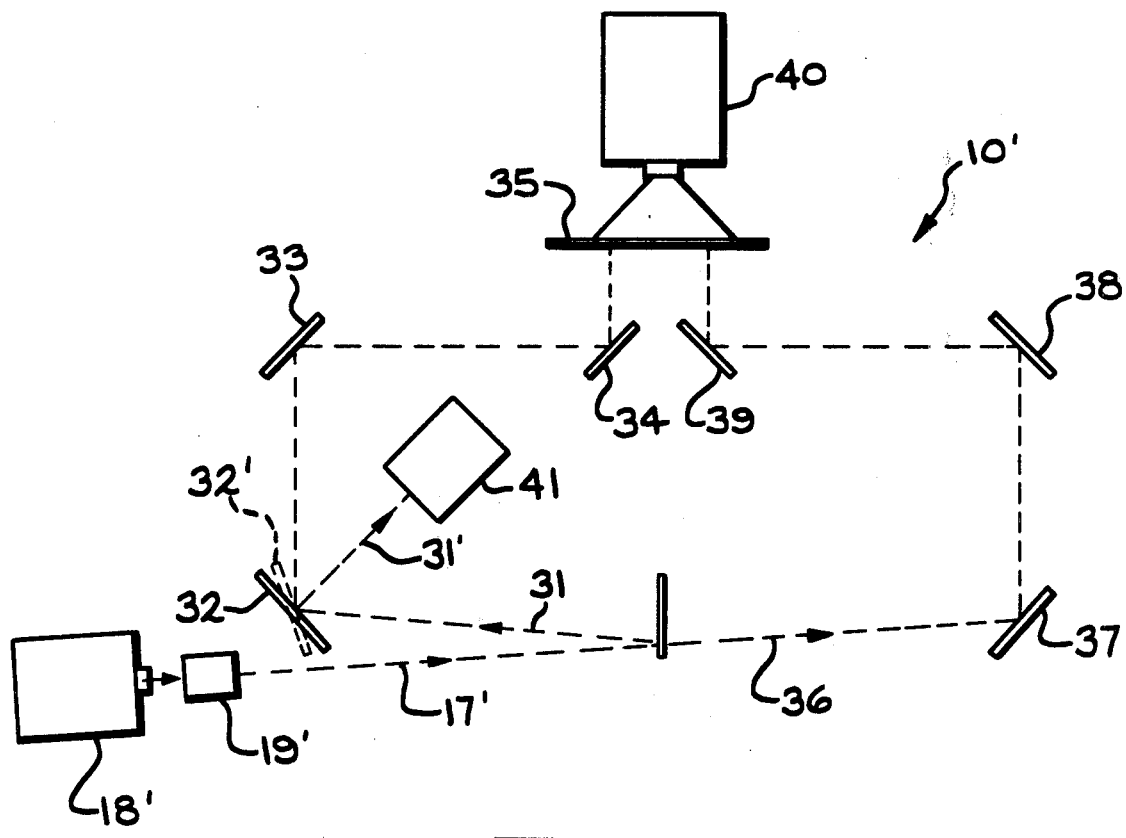
FIG. 6 is a top plan schematic view of apparatus for producing reflected and transmitted caustics from a cracked specimen and for producing a reflected fringe pattern from an uncracked specimen in accordance with the present invention.
Figure 4:
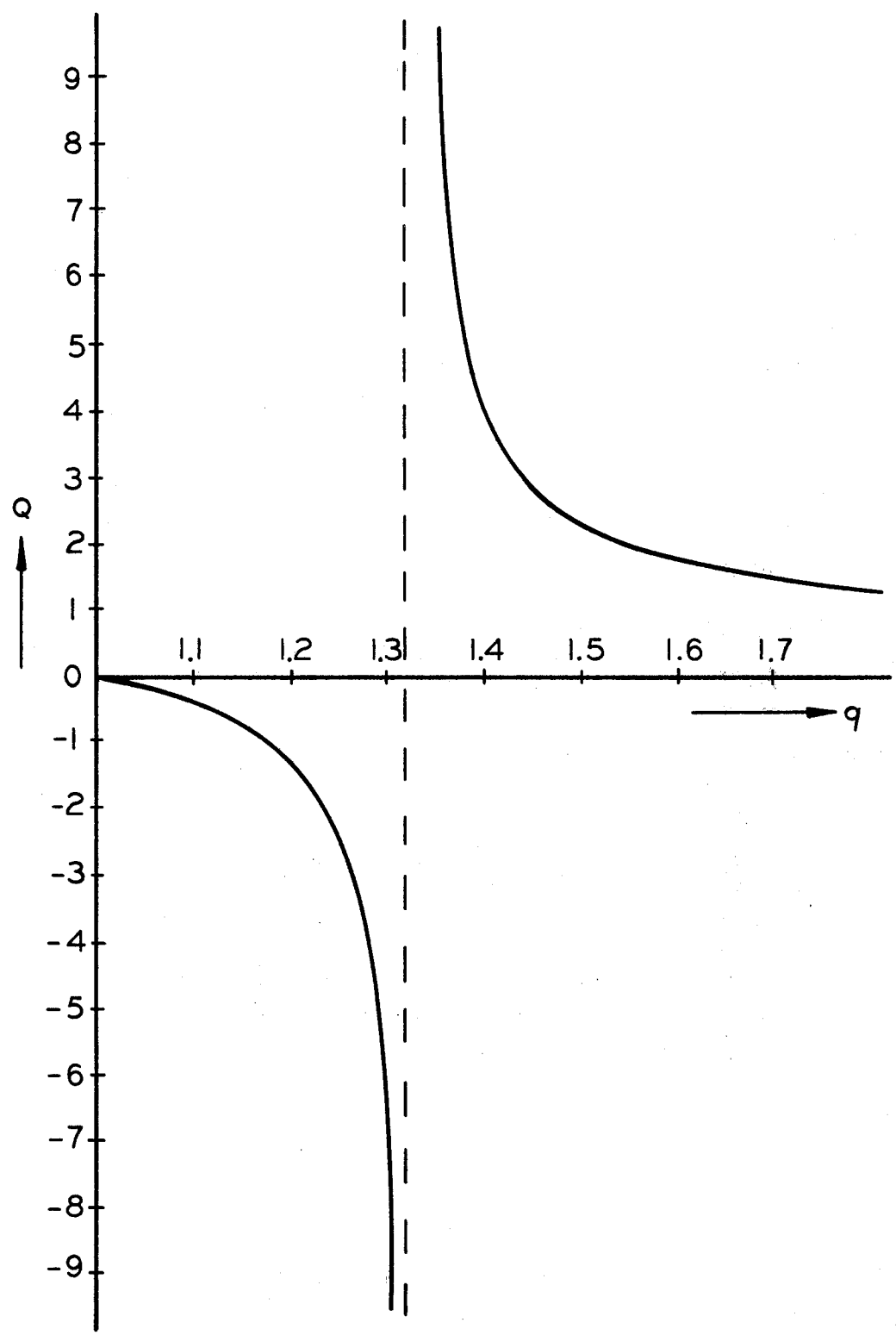
FIG. 4 is a graph for obtaining the quantity Q from the ratio q of the diameter of the reflected caustic to the diameter of the transmitted caustic.

A screen 21 is spaced from the specimen surface 20 and adjacent the path of the collimated monochromatic light beam 17 for intercepting and displaying through the shadow method a reflected caustic 22. Similarly, a screen 23 is positioned on an opposite side of the specimen 11 for intercepting and showing by the shadow method a transmitted caustic 24. The screen or plates 21 and 23 are spaced equal distances on opposite sides of the specimen 11. The reflected and transmitted caustics 22 and 24 are in the form of bright, generally circular envelopes defined between dense and fringed patterns appearing on the screens 21 and 23. The diameters of the caustics 22 and 24 are directly proportional to the load or force F applied to the specimen 11. In other words, the diameter of the caustics 22 and 24 increase as the force F is increased, until failure or a complete fracture occurs in the specimen 11. The force F is generally established at a value which provides sufficiently large diameters to the caustics 22 and 24 to facilitate their measurement. The actual magnitude of the force F need not be known or measured. If desired, one or both of the caustics 22 and 24 may be reflected to appear on a screen side by side with the other caustic or 22. Such an arrangement is illustrated in FIG. 6, which will be discussed in detail below. If desired, a standard grid pattern can be printed on the screens 21 and 23 to facilitate measuring the diameters of the caustics 22 and 24. After measurement, the diameter of the reflected caustic 22 is divided by the diameter of the transmitted caustic 24 to obtain a caustic diameter ratio q. The caustic diameter ratio q is used for determining the ratio of Poisson's ratio to modulus of elasticity and for determining the reflected and transmitted stress-optical constants or coefficient for the specimen 11.

An illustration showing exemplary reflected and transmitted caustics 22 and 24, respectively, for a specimen 11 is shown in FIG. 2. The diameter of the reflected caustic 22 is indicated by $D_r$ and the diameter of the transmitted caustic 24 is indicated by $D_t$. If the reflected caustic diameter $D_r$ is 1.38 inches and the transmitted caustic diameter $D_t$ is 1.05 inches, for example, then the diameter ratio q equals 1.31.

Either an uncracked specimen (not shown) of the same material as the specimen 11 or the cracked specimen 11 also is optically evaluated in an uncracked region which is not influenced by the constrained region adjacent the crack tip 16. When the collimated light beam 17 from the laser 18 and collimator 19 is directed to an unconstrained region of the specimen 11 or in an uncracked specimen, a reflected pattern of alternately light and dark fringes is produced on the screen 21. For an optically isotropic material, the reflected fringes are in the form of parallel straight dark lines extending in a direction perpendicular to the load or force F, as shown in FIG. 3. For an optically anisotropic material, the fringes may curve or have a non-uniform pattern. The pattern of dark fringes 27 is shown in FIG. 3 for a specimen of an optically isotropic material. As the load or force F applied to the specimen 11 is changed, the fringes 27 shown in FIG. 3 move upwardly or downwardly depending upon the direction in which the load is changed. With respect to an arbitrary point 28, the fringes 27 will move in the direction of the load, as illustrated by the arrow 29. For an anisotropic material, a change in load causes movement of the fringes 27 in both the direction 29 parallel to the direction of the load and in a direction indicated by an arrow 30 which is perpendicular to the load. For a predetermined change P in the force or loading F applied to the specimen, a number of fringes $N_1$ will move across the arbitrary point 28 on the screen 21 in the direction of the loading or arrow 29 for an isotropic specimen material. No fringes will move across the arbitrary point 28 in the direction of the arrow 30. Therefore, the average number $\overline{N}$ of fringes 27 crossing the point 28 will be equal to $N_1$ for an isotropic material. For an anisotropic material, $N_2$ fringes will cross the arbitrary point 21 in the direction of the arrow 30 in addition to $N_1$ fringes crossing in the direction of the arrow 29. The average number of fringes $\overline{N}$ crossing the arbitrary point 28 will then be equal to $$\overline{N} = \frac{N_1 + N_2}{2}$$

for a change in loading P. The change P in the force F applied in the specimen 11 causes the $\overline{N}$ fringes 27 to pass the arbitrary point 28 on the screen 21. A transducer 25, such as a piezoelectric crystal, a load cell, a strain gauge, or the like, is connected to an indicator 26 for indicating the magnitude of the force F applied to the specimen 11. The change in loading P is observed on the indicator 26 as the force F is changed. At the same time, $\overline{N}$ is obtained by counting the fringes 27 passing the point 28.

Other data required for determining the ratio of Poisson's ratio to modulus of elasticity include the width h of the specimen 11, which is readily measured, and the wave length $\lambda$ of the collimated monochromatic light beam 17 impinged upon the specimen 11. For a He-Ne laser, for example, the monochromatic light beam 17 has a wavelength of $\lambda = 6380°$ A. From this data, the ratio of Poisson's ratio to modulus of elasticity is determined by solving the following formula $$\frac{v}{E} = \frac{\lambda h}{2Q} \frac{\overline{N}}{P}$$

Figure 5:
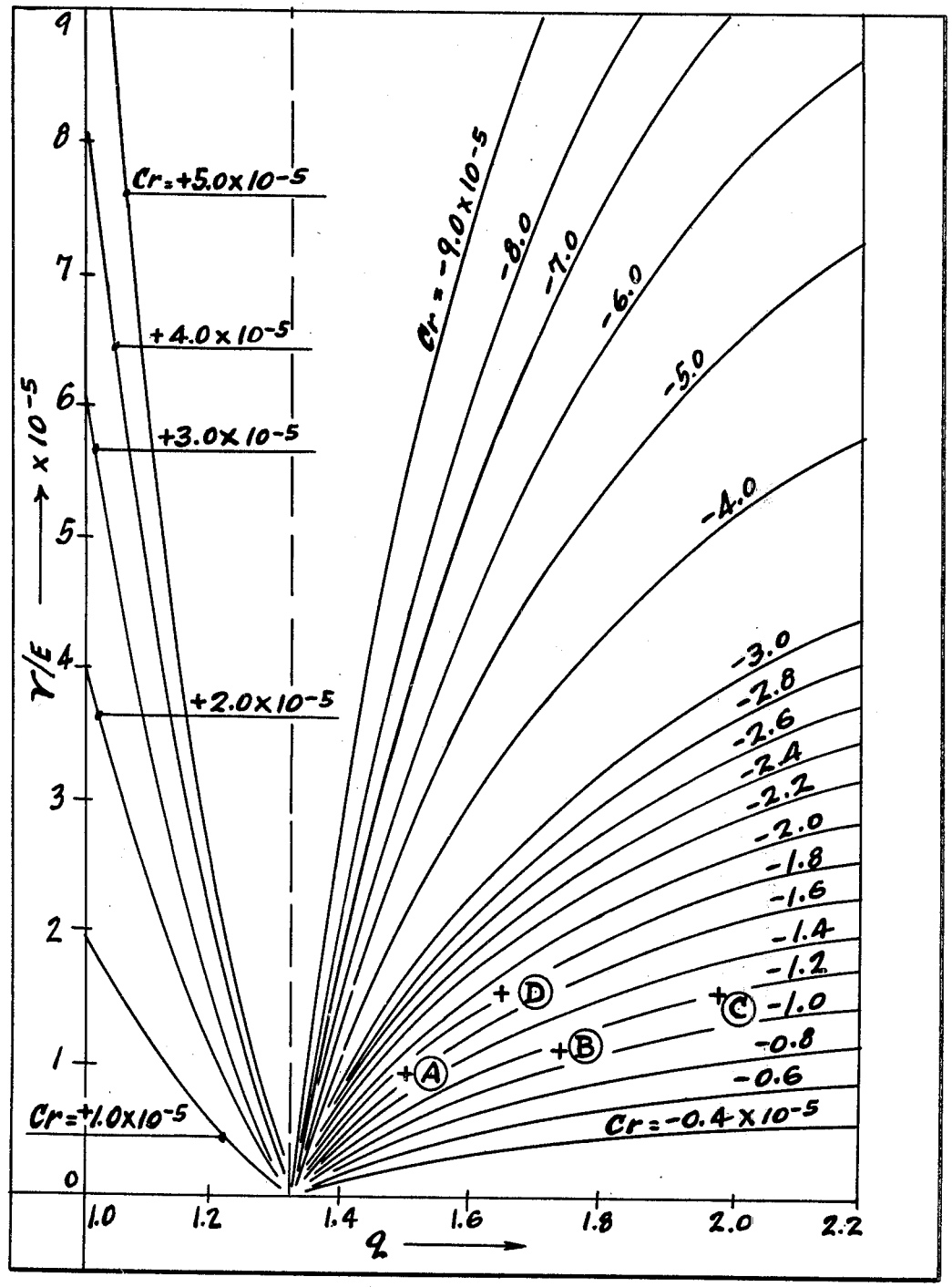
FIG. 5 is a graph for obtaining the reflected stress-optical constant $c_r$ from the previously determined caustic diameter ratio q and ratio of Poisson's ratio v to modulus of elasticity E.

This is a simplified formula in which Q is defined as $$Q = \frac{(q^{5/2} - 1)}{(q^{5/2} - 2)}$$

and where q is the transverse diameter ratio of the reflected to transmitted caustics. The above formula comparing Q to q may be graphed, as illustrated in FIG. 5. As will be readily apparent from FIG. 5, the quantity Q may be quickly determined from the chart of FIG. 5 for most values of q. Difficulty occurs only when q is approximately equal to $q^{5/2}$ or approximately equal to 1.32. In this region, the value of Q is extremely sensitive.

After the caustic diameter ratio Q and the ratio v/E of Poisson's ratio to modulus of elasticity are obtained, the reflected stress-optical constant $c_r$ for the specimen 11 is easily calculated or read from a chart. The reflected stress-optical constant $c_r$ can be calculated from the following formula $$c_r = \frac{v}{E}(1/2 - Q)$$

or, a graph may be established from this formula using a range of values of v/E for various specimen materials for one coordinate, a range of values of Q for a second coordinate and charting a family of curves for various values of $c_r$. Such a graph is shown in FIG. 5. Through the use of the graph in FIG. 5, $c_r$ is quickly determined with a high degree of accuracy from the previously determined values of v/E and the measured caustic diameter ratio q for a specimen. The actual reflected stress-optical constants $c_r$ for exemplary specimens are shown in the table below and also are on the chart of FIG. 5, where v/E is in cm $2/Kg \times 10^5$ and $c_r$ is in cm 2/Kg.

TABLE

| Specimen Material | | $\frac{v}{E}$ | q | $c_r$ |
|---|---|---|---|---|
| A. | Cast acrylic sheets | 0.9 | 1.5 | $-1.68 \times 10^{-5}$ |
| B. | Continuous processed acrylic sheets | 1.11 | 1.74 | $-1.11 \times 10^{-5}$ |
| C. | Clear polycarbonate sheets | 1.55 | 1.86 | $-\frac{1}{2} \times 10^{-5}$ |
| D. | Colored polycarbonate sheets | 1.55 | 1.64 | $-1.85 \times 10^{-5}$ |

It can be shown mathematically that the reflected and transmitted stress-optical constant for a specimen are related by the caustic diameter ratio q in accordance with the following formula $$\frac{c_r}{c_t} = 0.5 q^{5/2}$$

Therefore, once the reflected stress-optical constant $c_r$ is determined from q and from v/E, either by calculation or from the chart of FIG. 5, the transmitted stress-optical constant $c_t$ for the specimen is easily determined. If desired, a chart (not shown) also may be established for obtaining the transmitted stress-optical constant $c_t$ from the reflected stress-optical constant $c_r$ and the caustic diameter ratio q.

Turning now to FIG. 6, modified apparatus 10' is shown for obtaining the ratio v/E of Poisson's ratio to modulus of elasticity and for obtaining the stess-optical constants for an optically isotropic or anisotropic material. The apparatus 10' includes a laser or other monochromatic light source 18' and a collimator 19' for impinging a collimated monochromatic light beam 17' on a specimen 11'. In order to obtain reflected and transmitted caustics, the specimen 11' is provided with a crack (not shown) similar to the crack 12 shown in FIG. 1 and the light beam 17' is impinged upon the tip region of the crack. The reflected caustic travels a path 31 which is reflected off of three mirrors 32, 33 and 34 to the left side of a screen 35. Similarly, the transmitted caustic passes along a path 36 which is reflected by three mirrors 37, 38 and 39 to the right side of the screen 35. The mirrors are spaced such that the lengths of the paths 31 and 36 are identical. The screen 35 may be formed from a translucent material and may be provided with an etched grid pattern to facilitate measurement of the reflected and transmitted caustic diameters from behind the screen 35. Or, a photograph may be taken simultaneously of the reflected and transmitted caustics with a camera 38 positioned behind the screen 35. The caustic diameters then may be readily measured from the photograph. For measuring the change in fringes per change in load, the collimated monochromatic light beam 17' is impinged upon an uncracked specimen 11' while the specimen is loaded in a manner similar to that illustrated in FIG. 1. Again, a transducer such as the transducer 25 and the indicator 26 shown in FIG. 1 are provided for determining the change in load on the specimen. When an uncracked specimen is used, the reflected fringe pattern appears on the left side of the screen 35 at the same location that the reflected caustic would otherwise appear from a cracked specimen. However, the mirror 32 or one of the other mirrors 33 or 34 may be rotated, as illustrated in dashed lines by the mirror 32', to direct the fringe pattern along a path 31' to a photodetector and counter 41. The photodetector and counter 41 views the reflected fringe pattern at a relatively small point and automatically counts the fringes passing this point as the loading on the specimen 11' is changed. It should be noted that use of the photodetector fringe counter 41 allows the apparatus 10' to be operated under dynamic conditions while the load on the specimen 11' is changed. Prior art apparatus does not permit the measurement of the ratio of Poisson's ratio to modulus elasticity for specimens while such specimens are subjected to dynamic loading conditions.

From the above description of preferred embodiments of the invention, it should be appreciated that the ratio of Poisson's ratio to modulus of elasticity and the reflected and transmitted stress-optical constants for optically isotropic and optically anisotropic materials are readily determined from a specimen of such materials. The method of the present invention is particularly useful since only simple measurements are required, namely, a count in the movement of the fringes past a point as the loading on an uncracked specimen is changed by a predetermined amount, the measurement of the thickness of the uncracked specimen and the measurement of the diameters of two formed caustics for a loaded cracked specimen. Furthermore, the measurement are produced by relatively simple and inexpensive instruments which do not require accurate calibration. The method of the present invention is further simplified by the fact that to a great extent, the dimensions of the specimen are not critical. The only dimension which must be measured is the thickness h of the uncracked specimen. Through the use of a laser as a source for the collimated monochromatic light beam, the wavelength of the light beam will be known to a high degree of accuracy. Therefore, the ratio of Poisson's ratio to modulus of elasticity and the reflected and transmitted stress optical constants are easily determined with a high degree of accuracy.

It will be appreciated that various modifications and changes may be made in the above-described preferred embodiments of the method without departing from the spirit and scope of the following claims.

What we claim is:

1. A method of evaluating properties of transparent optically isotropic and optically anisotropic materials comprising the steps of:

applying a tensile load to an uncracked region of a flat rectangular specimen of the material, such specimen having a predetermined thickness and simultaneously impinging a collimated monochromatic light beam having a predetermined wavelength on the uncracked region of the specimen from a direction substantially perpendicular to a flat surface of the specimen and to the load applied to the specimen whereby a fringe pattern is reflected from the specimen;

changing the load on the specimen and simultaneously counting the average number of fringes in the reflected fringe pattern crossing an arbitrary point in the reflected fringe pattern for a predetermined change in the load on the specimen;

forming a crack in a flat rectangular specimen of the same material, said crack extending from a region at the center of a long edge of said cracked specimen into said cracked specimen a distance to assure that caustics formed from a constrained region adjacent a crack tip are free from the influence of free surfaces of the specimen;

applying a tensile load to said cracked specimen in a direction perpendicular to said crack and simultaneously impinging a collimated monochromatic light beam on the constrained region in said cracked specimen adjacent the crack tip from a direction substantially perpendicular to a flat surface of the specimen and to the load applied to the specimen whereby caustics are transmitted through and reflected from the specimen;

measuring the effective diameters of the transmitted and reflected caustics at locations spaced equidistant from and on either side of the specimen; and determining the ratio of Poisson's ratio to the modulus of elasticity for the material from said measured caustic diameters, said predetermined load change, said fringe count, said wavelength and said predetermined thickness.

2. The method of claim 1 wherein said cracked specimen is impinged with such collimated monochromatic light beam and the effective caustic diameters are measured prior to impinging said uncracked specimen region with such collimated monochormatic light beam and counting the average number of fringes crossing the arbitrary point for the predetermined change in load.

3. The method of claim 2, and further including the step of determining a stress-optical constant for the specimen material from the ratio of the measured caustic diameters and the determined ratio of Poisson's ratio to modulus of elasticity.

4. The method of claim 1, and further including the step of determining a stress-optical constant for the specimen material from the ratio of the measured caustic diameters and the ratio of Poisson's ratio to modulus of elasticity.

5. The method of claims 1, 2, 3 or 4, wherein said specimens are impinged with collimated monochromatic light beams from a laser and a collimator.

* * * * *